(12) United States Patent
Callahan et al.

(10) Patent No.: US 7,523,447 B1
(45) Date of Patent: Apr. 21, 2009

(54) CONFIGURATOR USING MARKUP LANGUAGE

(75) Inventors: Letha M. Callahan, Thornton, CO (US); Bruce W. Robinson, Longmont, CO (US); Mindy K. Pfeifer, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 928 days.

(21) Appl. No.: 10/671,279

(22) Filed: Sep. 24, 2003

(51) Int. Cl.
*G06F 9/45* (2006.01)

(52) U.S. Cl. .................................................. 717/135

(58) Field of Classification Search ......... 717/124–133, 717/101, 135
See application file for complete search history.

(56) References Cited

U.S. PATENT DOCUMENTS

| | | | |
|---|---|---|---|
| 4,009,343 A * | 2/1977 | Markey et al. | 370/321 |
| 6,075,848 A | 6/2000 | Lunn et al. | |
| 6,754,843 B1 | 6/2004 | Lu et al. | |
| 6,775,824 B1 * | 8/2004 | Osborne et al. | 717/125 |
| 6,826,716 B2 * | 11/2004 | Mason | 714/38 |
| 6,895,578 B1 * | 5/2005 | Kolawa et al. | 717/130 |
| 6,934,934 B1 * | 8/2005 | Osborne et al. | 717/126 |
| 6,944,848 B2 * | 9/2005 | Hartman et al. | 717/124 |
| 6,948,153 B2 * | 9/2005 | Bowers | 717/124 |
| 6,966,048 B2 * | 11/2005 | Bowers | 717/101 |
| 6,968,363 B1 * | 11/2005 | Mulvey | 709/217 |
| 7,000,224 B1 * | 2/2006 | Osborne et al. | 717/125 |
| 7,054,308 B1 | 5/2006 | Conway | |
| 7,124,401 B2 * | 10/2006 | Muller et al. | 717/124 |
| 7,127,641 B1 * | 10/2006 | Anderson | 714/38 |
| 7,149,226 B2 * | 12/2006 | Wolrich et al. | 370/412 |
| 7,236,483 B2 | 6/2007 | Yeom | |
| 7,239,166 B2 * | 7/2007 | Braverman et al. | 324/765 |
| 7,328,428 B2 * | 2/2008 | Baugher | 717/124 |
| 2003/0235280 A1 | 12/2003 | Shafie-Khorasani et al. | |
| 2004/0160983 A1 | 8/2004 | Kuskin et al. | |
| 2004/0240385 A1 | 12/2004 | Boggs et al. | |
| 2006/0146820 A1 | 7/2006 | Friedman et al. | |
| 2007/0286374 A1 | 12/2007 | Romeo | |

OTHER PUBLICATIONS

Wilson, Gregory V., "XML-Based Programming Systems," Doctor Dobb's Journal, pp. 16-24, Mar. 2003, 6 pages.
"Welcome to Superx++ Source!," available at http://xolusplus.sourceforge.net/IndexPage.html, downloaded Feb. 27, 2003, 3 pages.
"Download XppEngCOM.dll," available at http://xplusplus.sourceforge.net/Downloads/XppEngCOM.html, downloaded Feb. 27, 2003, 2 pages.
"Download XppEngFilt.dll," available at http://xplusplus.sourceforge.net/Downloads/XppEngFilt.html, downloaded Feb. 27, 2003, 1 page.
"Download XppConsole.exe," available at http://xplusplus.sourceforge.net/Downloads/XppConsole.html, downloaded Feb. 27, 2003, 2 pages.
"Download XppHub.exe," available at http://xolusplus.sourceforge.net/Downloads/XppHub.html, downloaded Feb. 27, 2003, 1 page.
"Download XppExt.dll," available at http://xplusplus.sourceforge.net/Downloads/XppExt.html, downloaded Feb. 27, 2003, 1 page.
"Download XppTester.exe," available at http://xplusplus.sourceforge.net/Downloads/XppTester.html, downloaded Feb. 27, 2003, 3 pages.
White Paper entitled, "IP Telephony : The Five Nines Story," Cisco Systems, Inc. (Aug. 26, 2002), available at http://www.cisco.com/warp/public/cc/so/neso/vvda/iptl/5nine_wp.pdf.
Gary Audin, "Reality Check on Five-Nines," Business Communications Review (May 2002), available at http://www.bcr.com/bcrmag/2002/05/p22.php, pp. 22-27.
"LSSGR: Reliability, Section 12, A Module of LSSGR, FR-64," Telcordia Technologies, GR-512-CORE, Issue 2 (Jan. 1998).
Roger L. Freeman, "Chapter 1: Some Basics in Conventional Telephony," Telecommunication System Engineering, pp. 1-57 (1980).

\* cited by examiner

*Primary Examiner*—John Chavis
(74) *Attorney, Agent, or Firm*—Sheridan Ross P.C.

(57) ABSTRACT

A software-controlled computational component for processing input data is provided that includes a control program 148 for controlling the operation of a first computational component, an input for input data, and an output for output data. Each of the machine code for the control program, the input data, and the output data are expressed in a markup language, such as Extensible Markup Language.

26 Claims, 8 Drawing Sheets

CONFIGURATOR USING MARKUP LANGUAGE

FIELD OF THE INVENTION

The present invention relates generally to the configuration of sales orders and specifically to the configuration of sales orders directed to a plurality of inter-related software and/or hardware components.

BACKGROUND OF THE INVENTION

Configurators, such as GES™ Configurator by Trilogy, are widely used to assist sales personnel in accurately inputting correct sales orders involving a number of inter-related components. In a telecommunications software/hardware environment, when a sales person inputs part of the telecommunications switch/server requirements of the customer the configurator can provide the sales person with additional questions to ask the customer to complete the necessary information for the configurator to determine the order. The configurator can then provide the sales person with a listing of each necessary hardware/software component (or bill of materials) for the switch/server and the pricing information associated with the order. The configurator can substantially reduce errors in bills of material for complex inter-relationships among system components and thereby increase customer satisfaction.

The process to properly develop the configurator can be labor intensive and costly. Currently in a software/hardware environment, a computer software engineer designs the hardware/software component(s) and prepares documentation describing the inter-relationships among the component(s). A configurator system engineer then takes the documentation and writes the functional specification for the documentation. The specification is typically in the form of a plain text document. A developer laboriously converts the functional specifications into code to create the configurator. The code must then be tested to identify errors. The testing is typically done by testing engineers using manual methods or a testing tool such as TestMaster. The process from preparation of the functional specifications to validation of the coding can take thousands of man hours for complex software/hardware inter-relationships.

SUMMARY OF THE INVENTION

These and other needs are addressed by the various embodiments and configurations of the present invention. The present invention is directed to a method for operating a configurator and a method for simulating the operation of a configurator. The software for controlling the configurator and simulator are written in a, preferably extensible, markup language, such as Extensible Markup Language or XML, using a defined programmatic syntax. As will be appreciated, "syntax" refers to the structure of expressions and/or symbols in a language and the rules governing the language structure, such as the relationship of characters or groups of characters and the rules for construction of a statement. In one configuration, the syntax uses XML as an object-oriented, event-driven data manipulation language.

As will be appreciated, a markup language is normally a language used to define information to be added to the content of a document as an aid to processing it. Markup languages are typically highly structured hierarchical language, such as XML, HyperText Markup Language or HTML, and _XSL. XML is derived from Standard Generalized Markup Language or SGML (ISO 8879) and is commonly used as an inter-entity data definition, structuring, and data communication language. It is also used for the specification of data-entry forms, predominantly in web-based applications. Normally, the JAVA programming language performs the data management tasks. As discussed below, the XML syntax itself is extended to include object-oriented, event-driven functionality to perform the data management role.

In one embodiment, the structuring capability of markup languages is employed for the specification of a user-interface and the bill of materials. The structure of the Graphical User Interface or GUI being tested and the functional specifications of the GUI are translated into the markup language. Once the structure and the rules are translated, test cases templates are created by randomly choosing data or by specifying specific input profiles and producing the expected outcome of the chosen data. The robotically generated user-input data or a derivative thereof is then run through the GUI associated with the application under test. The actual generated reports are then compared to simulated reports to determine any differences.

In this embodiment, the markup language structures define the forms (GUI), the materials, and the rules for the inclusion and exclusion of the materials in a configuration. The procedural extension supplies the additional programmatic capability for robotic, profile-based data entry simulation, realization of material production rules, generation of simulated configuration reports, production of parallel application driver scripts, control of simulation and application differencing engines, and management of simulation and application output and difference files.

The present invention can have a number of advantages. For example, by using a user friendly and easy to read markup language such as XML the test or configurator system engineer may write the requirements document or functional specification describing the inter-relationships among the materials components, thereby avoiding the need for a highly trained developer. This can represent an automation effort that is reduced by 25% to 35% compared to current automation efforts. A programming staff skilled in object-oriented languages such as Trilogy, JAVA, and C++ is notoriously expensive. Using the markup language-based method of the present invention, the learning curve required to write the language is significantly reduced. It may even be possible for the designers of the component to prepare the requirements document or functional specification in a markup language thereby providing further reductions in automation effort. Markup languages generally require rigorous definition which is a significant improvement over today's specifications, require less text than is currently used with plain text specifications, and provide more coverage possibility by making it easier to define specific coverage paths. The use of markup languages can reduce and refocus test engineering on validating that the specification accurately reflects the intent of technical and marketing personnel. By simulating the configurator using a markup language as a programming language, the configurator simulator of the present invention can automate accurately and rapidly the creation of large volumes of configurator test cases, driving parallel application behavior and production and analysis of results differences. It can be a cost efficient and flexible tool to allow for saturation testing of the configurator. The use of markup language syntax in the requirements specification can be used as the control program for the configurator without the need for further coding. In other words, the application can be generated directly from the requirements specification. For example, the configurator simulator can cause a reduction of 50% in the amount of time to produce a fully simulated configurator model compared to conventional simulators. The simulator can be a profile-based, robotic user-to-application dialog engine, which consolidates the functionality of XML data structuring, Data Type Definition or DTD syntax enforcement, JAVA procedural capability, and style sheet behaviors, into a single syntax. The use of an XML program to process data expressed in XML can provide a "self-aware" data that understands how to process itself, thereby providing substantial gains in computational efficiencies.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Simulation of a Computational Component

The Mass Test Generator (MTG) or configurator simulator is a cost efficient and flexible tool that allows for saturation testing of software applications by simulating the application's behavior, preferably using XML (eXtensible Markup Language) as a programming language. The MTG allows for the creation of large volumes of test cases, which can be used to increase the quality of the software applications.

When the configurator is the application being simulated, standard XML is preferably used to define the graphical user interface (GUI) forms presented to the user and the configurator application's rules and materials and to produce an output of simulated configuration reports, error messages, and test scripts. A test harness tool then takes the test scripts and executes them against the actual GUI engine. The scripts are also designed to capture the configurator reports and/or messages to allow for differencing the MTG simulated reports and messages against the actual configurator reports.

Figure 1:
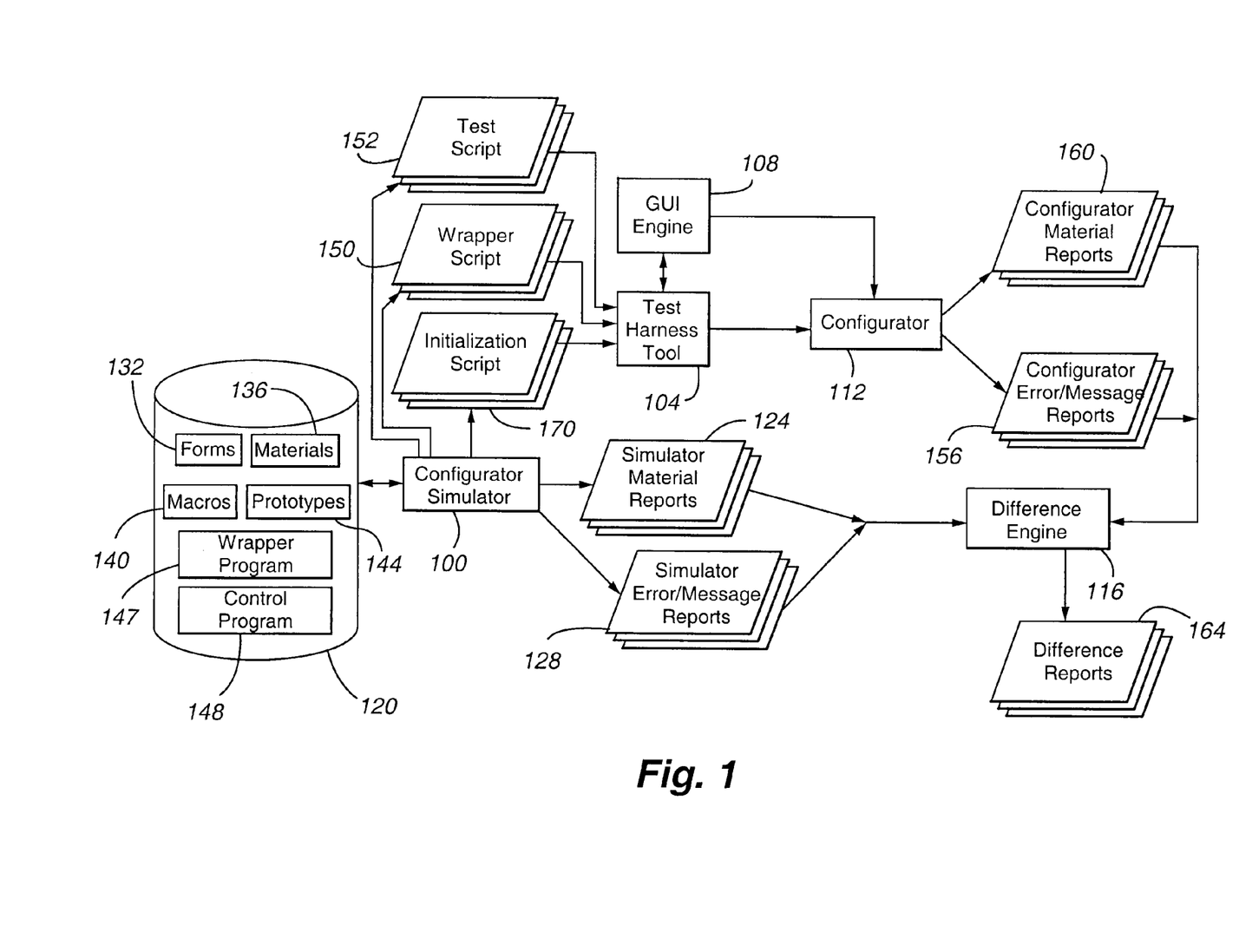
FIG. 1 is a block diagram depicting a first embodiment of an architecture according to the present invention.

Referring now to FIG. 1, a system architecture for simulating a configurator will be discussed. The architecture comprises a configurator simulator 100, a test harness tool 104, a GUI engine 108, a configurator 112, a difference engine 116, and a database 120.

The simulator 100 accesses database 120 to configure test cases, provides output to the test harness tool 104 corresponding to the test case, and simulates the operation of the configurator 112 to produce outputs, namely simulator material reports 124 and simulator error reports 128. The simulator 100 uses simulation information, namely forms 132, materials 136, macros 140, prototypes 144, and wrapper and control programs 147 and 148 to perform these activities. This simulation information is discussed in detail below in connection with the database 120.

The test harness tool 104 receives a plurality of wrapper scripts 150 and initialization scripts 170 from the simulator 100 and, for each script, opens the GUI engine 108, selects a particular product, configures the test case, receives an initial wrapper script 150 from the simulator that lists the products to be tested, opens the GUI engine 108, loads an initialization script 170 that lists all tests scripts for the specific product, opens the specific product configurator 112, configures a test script 152, copies the material report 160 output by the configurator 112 for the test case, saves the materials and error reports 160 and 156 for the test case, closes the product configurator 112 for the test case, loads the next test script 152 until all have been run for the specific product(s), and selects the initialization script 170 corresponding to the next product and repeats the above steps.

The configurator 112 can be any suitable configurator, such as the GES configurator™ by Trilogy™. Based on input received from the test harness tool 104, the configurator 112 outputs, for each test case, the configurator material and error message reports.

The difference engine 116 selects and compares, for each case, the corresponding simulator error reports 128 against the corresponding configurator error reports 156 and the corresponding simulator material reports 124 against the corresponding configurator material reports 160 and outputs a difference report 164 of each type for the test case. The difference report 164 is used by testing engineers to identify errors in the forms 132, materials 136, macros 140, prototypes 144, wrapper and control program 148, and/or the configurator code.

The database 120 can be any suitable internal and/or external data storage device. Typically, the database is implemented as an operating file system but, in a larger project, a database management system such as an Oracle™ database can be used.

The database comprises a number of data structures, namely forms 132, materials 136, macros 140, and prototypes 144 and wrapper and control programs 147 and 148 for each product. These various data structures and the wrapper and control programs are preferably written in a suitable markup language syntax, such as XML augmented with a procedural syntax.

As will be appreciated, scripting syntax for a markup language, such as XML, has a number of elements. A parent tag or "top" tag can have one or more children tags, grandchildren tags, and so forth. The children, grandchildren, etc., tags of the parent tag are said to be in the domain of the parent tag. Attributes of a tag may be stated within a parent tag or as separate tags in the domain of the parent tag. Each tag belongs to a class, such as the classes function, control, object, procedure, condition, method, statement, and attribute. Depending on its class, a tag may have a name or a reference attribute, where the name is the name of the tag itself and the reference refers to another object.

Forms 132 is a representation (e.g., the structure and functional specifications) of the GUI and its objects for a computational component such as the GUI engine 108 and configurator 112; materials 136 is a representation of the rules governing bill of materials and configurable product; macros 140 allow for a short hand way of writing (or referencing/ identifying) repeated blocks of code; prototypes 144 define attribute behaviors and relationship of all aspects of the various data structures; the GUI wrapper program 147 contains the test harness code to open the GUI engine 108, and the control program 148 contains the test harness code necessary to execute (and/or create) the test cases within the configurator simulator 112 and the associated output.

Figure 2:
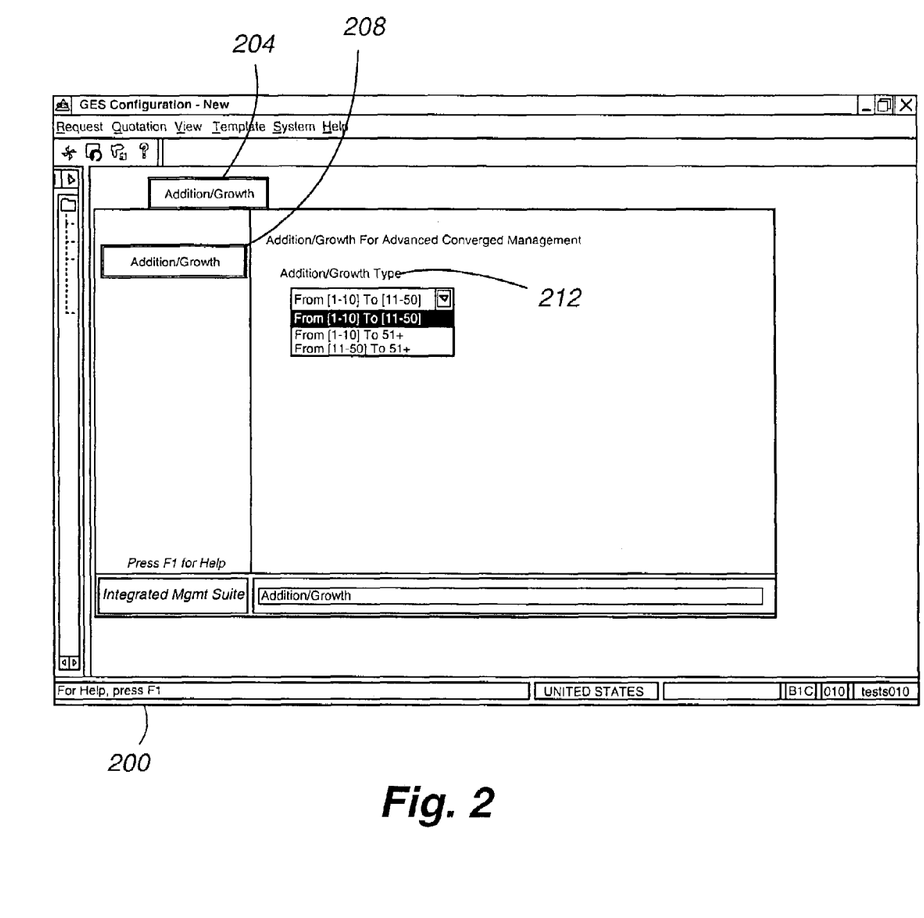
FIG. 2 depicts a GUI display in the architecture of FIG. 1.

The first step in automating an application is to simulate the Guls produced by the GUI engine 108. Referring to FIG. 2, a snapshot of an exemplary GUI is illustrated. The GUI is an example of the "Additions" product line of the Integrated Management Suite (IMS) configurator, which will be used through out the detailed description as a basis for examples. This GUI 200 contains 3 objects: two tabs 204 and 208 and one drop down menu 212.

There are some fundamental aspects of the forms data structure when written in XML: control tags and their valid attributes, names of the control tags, test script attributes, and profiling attributes. The first step is to simulate all of the configurator's GUI controls. With FIG. 2 above one can see that there is a top-level tab named "Addition/Growth" 204 that contains a child tab named "Addition/Growth Type__1" 208 that contains a drop down menu 212 named "Addition/Growth Type" 208 that contains a list of items: "From [1-10] To [11-50]", "From [1-10] To 51+", and "From [11-50] To 51+".

Below the GUI of FIG. 2 is represented in an XML form. Because of the domain structure of XML, the GUI is represented in a series of parent/child relationships as described above in English.

```
<tab winname="Addition/Growth">Addition/Growth
    <tab winname="Addition/Growth_1">Addition/Growth_1
        <menu>Addition/Growth Type
            <item winname="ListBox">From [1-10] To [11-50]</item>
            <item winname="ListBox">From [1-10] To 51+</item>
            <item winname="ListBox">From [11-50] To 51+</item>
        </menu>
    </tab>
</tab>
```

Each control has an appropriate control tag identifier such as <tab> or <menu>, and an associated name of the control tag such as "Addition/Growth". The test harness tool attribute, "winname", of the control tag is specified within the open control tag. The harness tool attribute provides the value of the name of the control as specified in the harness tool application. This harness tool attribute is used by the configurator simulator to produce test script outputs. The production of test script outputs is discussed in more detail below. Profiling attributes are also an aspect of the XML-simulated GUI forms. Profiling attributes direct the configurator simulator to select specific inputs. For example, if a user wanted to have a checkbox selected 75% of the time, then they would profile that checkbox at the forms level by adding a profile attribute called "coverage".

<checkbox coverage="75"> Name of Control</checkbox>

The example above would direct the configurator simulator to select the checkbox 75% of the time over-riding the defaulted action of the configurator simulator, which would have randomly selected the checkbox for each test case. Profiling is also performed at the prototype level.

Once the GUI is simulated in XML, the tester will translate the English written Functional Specifications into XML as well. Below are the English rules associated with materials 136 for an exemplary telecommunications system referred to as "IMS Additions", followed by the XML-translated version of the rules. English rules associated with materials for the system are as follows:

Calculations/Output

If the user has "1-10 systems" and wants to grow to "11-50 systems", then order one "Advanced Converged Management Upgrade 11-50 Systems material (178870)".

If the user has "1-10 systems" and wants to grow to "50+ systems", then order one "Advanced Converged Management Upgrade 50+ Systems material (178871)".

If the user has "11-50 systems" and wants to grow to "50+ systems", then order one "Advanced Converged Management Upgrade 50+ Systems material (178871)".

Rules Translated to XML:

```
<section>IMS Additions Materials
    <material value="1" SMC="178870"> ADV CNVG MNG UPG 11-50 SYS
        <eq string="From [1-10] To [11-50]">menu.Addition/Growth Type</eq>
    </material>
    <material value="1" SMC="178871"> ADV CNVG MNG UPG 50+ SYS
        <or>
            <eq string="From [1-10] To 51+">menu.Addition/Growth Type</eq>
            <eq string="From [11-50] To 51+">menu.Addition/Growth Type</eq>
        </or>
    </material>
</section>
```

As shown above, the materials 136 use both the English functional specification rules and the forms 132 controls to condition a material into, or out of, existence. For example, the tester would use the English Functional Specification rule below:

If the user has "1-10 systems" and wants to grow to "11-50 systems", then order one "Advanced Converged Management Upgrade 11-50 Systems material (178870)". and the associated control from the XML forms document:

```
<menu>Addition/Growth Type
    <item winname="ListBox">From [1-10] To [11-50]</item>
    <item winname="ListBox">From [1-10] To 51+</item>
    <item winname="ListBox">From [11-50] To 51+</item>
</menu>
``` to produce the simulated XML material for the system:

```
<material value="1" SMC="178870"> ADV CNVG MNG UPG 11-50 SYS
    <eq string="From [1-10] To [11-50]">menu.Addition/Growth Type</eq>
</material>
```

This material is only generated if the item "From [1-10] To [1-50]" of the menu drop down box "Addition/Growth Type" is selected. If this item is not selected, then the material does not exist and will not be generated on any output reports.

To assist in translating the material rules into XML, macros can be developed. A macro is a quick and easy way to represent a block of XML that is used repeatedly in the code. An example is shown below:

```
<section>IMS Additions Macros
    <macro>Domestic
        <body>
            <or>
                <eq string="UNITED STATES ">menu.Country</eq>
                <eq string="CANADA">menu.Country</eq>
            </or>
        </body>
    </macro>
```

This example would allow the tester to replace the code:

```
<or>
    <eq string="UNITED STATES">menu.Country</eq>
    <eq string="CANADA">menu.Country</eq>
</or>
``` with the following:
<Domestic/>

Another example might be if the telecommunications system could only support a handful of specific countries, then the tester might want to develop a macro to short hand this information. If, for example, the telecommunications system was only available for certain Latin American countries, then instead of having to write all of the XML materials showing the valid countries in this manner:

```
<material value="1" SMC="178870"> ADV CNVG MNG UPG 11-50 SYS
    <and>
        <eq string="From [1-10] To [11-50]">menu.Addition/Growth Type</eq>
        <eq string="ARGENTINA">menu.Country</eq>
        <eq string="BOLIVIA">menu.Country</eq>
        <eq string="BRAZIL">menu.Country</eq>
        <eq string="CHILE">menu.Country</eq>
        <eq string="COLOMBIA">menu.Country</eq>
        <eq string="COSTA RICA">menu.Country</eq>
        <eq string="EL SALVADOR">menu.Country</eq>
        <eq string="JAMAICA">menu.Country</eq>
        <eq string="MEXICO">menu.Country</eq>
        <eq string="PANAMA">menu.Country</eq>
        <eq string="VENEZUELA">menu.Country</eq>
    </and>
</material>
```

The tester could develop a macro 140 in the XML macros document for the countries that are available for IMS Additions and use this in the XML materials document instead.

```
<macro>IMSCountries
    <body>
        <or>
            <eq string="ARGENTINA">menu.Country</eq>
            <eq string="BOLIVIA">menu.Country</eq>
            <eq string="BRAZIL">menu.Country</eq>
            <eq string="CHILE">menu.Country</eq>
            <eq string="COLOMBIA">menu.Country</eq>
            <eq string="COSTA RICA">menu.Country</eq>
            <eq string="EL SALVADOR">menu.Country</eq>
            <eq string="JAMAICA">menu.Country</eq>
            <eq string="MEXICO">menu.Country</eq>
            <eq string="PANAMA">menu.Country</eq>
            <eq string="VENEZUELA">menu.Country</eq>
        </or>
```

-continued

```
        </or>
    </body>
</macro>
```

Then the tester would be able to write the rules in a short hand manner using the macro as follows:

```
<material value="1" SMC="178870"> ADV CNVG MNG UPG 11-50 SYS
    <and>
        <eq string="From [1-10] To [11-50]">menu.Addition/Growth Type</eq>
        <IMSCountries/>
    </and>
</material>
```

As the Configurator Simulator "reads" the XML materials document, it will understand the macro syntax and use the XML macros document to substitute any short hand syntax with the expanded version in the XML macros document.

Prototypes 144 are the data type definitions of the other documents. They inform the Configurator Simulator as to how each line of the document, particularly XML lines, should behave. Shown in the example below are some of the valid attributes associated with the prototype named "material":

```
<prototype class="object" doc="MTG Material Prototype.htm">material
    <attributes>
        <tag type="identifier"/>
        <name type="identifier"/>
        <value type="number" spec=" produce *"/>
        <minvalue type="number"/>
        <maxvalue type="number"/>
        <SMC type="string" spec=" SMC *"/>
    </attributes>
</prototype>
```

If a material object is created with an attribute other than what is specified in the prototype for that object, then the configurator simulator will produce an error upon execution that will inform the tester that the object has an undefined attribute associated with it. The tester will need to correct the object or update the prototype for that object.

Within the prototypes 144 the default profile behaviors are also defined. Each object has a defaulted profile behavior that defines the way that each object "answers" at the time of creation of a test case. Shown below is the default behavior of the prototype for "menu".

```
<prototype class="control" doc="MTG Controls Prototype.htm">menu
    <default>
        <ue_answer>
            <data>
                <number>coverage
                    <value>
                        <translate fromlist="NULL" attrname="coverage">
                            menu.parent
                            <tolist>number.Coverage</tolist>
                        </translate>
                    </value>
                </number>
```

-continued

```
        </data>
        <set>menu.parent
            <or>
                <eq string="TRUE" attrname="required">menu.parent</eq>
                <notis>number.coverage</notis>
                <ge>number.coverage
                    <number>
                        <randomnumber minvalue="1" maxvalue="100"/>
                    </number>
                </ge>
            </or>
            <value>
                <randomattribute attrname="name">menu.parent
                    <taglist value="item,radiobutton"/>
                </randomattribute>
            </value>
        </set>
    </ue_answer>
  </default>
</prototype>
```

The default profile behavior for a menu is for the simulator to "answer" the forms by first looking for a "coverage" profile attribute for the menu control. This "coverage" profile attribute is a valid attribute of the controls. The "coverage" profile is discussed in detail above. If no "coverage" profile attribute is defined, or if it exceeds a range of 1-100, then the robot will randomly select one of the menu's children items or radio buttons.

In addition to defining valid attributes associated with the objects, and defining the default behavior of these objects, prototypes 144 can also contain the code necessary to automatically generate test scripts 152. Below is an example of the test harness tool functionality of the XML prototype of "item".

```
<prototype class="object" doc="MTG Item Prototype.htm">item
    <default>
        <event>
            <is>item.parent</is>
            <wr>item.parent</wr>
        </event>
        <winrunner>
            <set attrname="winname" value="ListBox">item.parent
                <notis attrname="winname">item.parent</notis>
            </set>
            <set attrname="caption">item.parent
                <notis attrname="caption">item.parent</notis>
                <value attrname="name">item.parent</value>
            </set>
            <print>file.WinRunner
                <ne string="CONTROLMENU" attrname="type">menu.parent
                </ne>
                <value>
                    <format pattern="list_select_item ("%s", "%s");">
                        <reference attrname="winname">item.parent</reference>
                        <reference attrname="caption">item.parent</reference>
                    </format>
                </value>
            </print>
            <print>file.WinRunner
                <print value="here"/>
                <eq string="CONTROLMENU" attrname="type">menu.parent
                </eq>
                <value>
                    <format pattern="menu_select_item ("%s");">
                        <reference attrname="winname">item.parent</reference>
                    </format>
                </value>
            </print>
        </winrunner>
    </default>
</prototype>
```

As will be appreciated, "winrunner" is the callout name of the test harness tool application.

Using the "winname" defined in the forms 132 documents and the simulator generated value of the control object, the configurator simulator will generate a line of harness tool syntax and save it to a test script file. Putting all of these together, the engine can produce a line of harness tool code such as the following Winrunnemm code:

list_select_item ("ListBox", "From [1-10] To [11-50]");

When the test script file 152 is executed in the test harness tool, the tool 104 will understand that it will need to select "From [1-10] To [11-50]" from the menu drop down box. With other uses of the test harness tool, developers only re-run existing harness tool test scripts against a newer version of the software, but the simulator actually creates new test scripts with each test case, complete with different values and selections just as if a user were making the inputs to the configurator GUI Forms.

Figure 3:
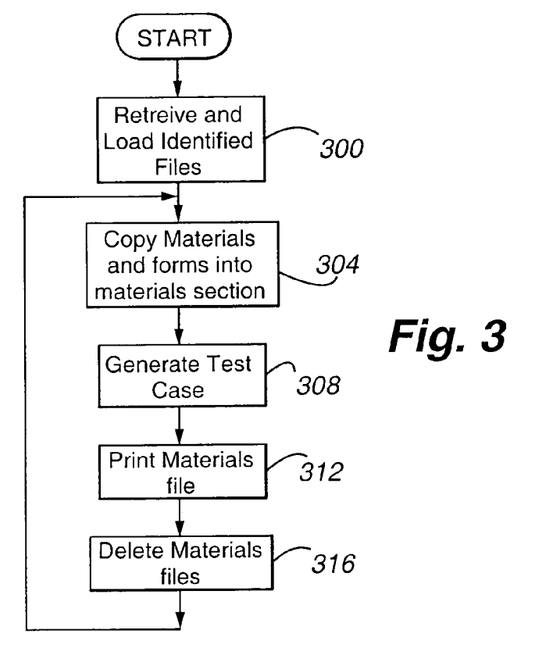
FIG. 3 is a flow chart depicting the operation of the configurator simulator of FIG. 1.

Additional files are needed to execute test cases and support the process of running scripts with the test harness tool application. The execution of test cases is handled through the wrapper and control programs 147 and 148. This control program contains the basic organization of the execution process contains sections that include files and represent place holders for form data and calls procedures that comprise parts of the wrapper script as well as procedures related to run test cases. The abstraction of an exemplary configurator, which is depicted in FIG. 3, is shown here:

```
<section>IMS Additions
    <section>Macros
        <include file="IMS XML Macros"/>
    </section>
    <section>XML Prototypes
        <include file="LMS XML Prototypes"/>
    </section>
    <section>Materials Prototypes
        <data>
            <include file="IMS XML Materials"/>
            <include file="IMS XML Forms"/>
        </data>
    </section>
    <section>Materials
    </section>
    <section>Main
        <procedure>Main
            <loop>
                <copy>
                    <from>section.Materials Prototype</from>
                    <into>section.Materials</into>
                </copy>
                <evaluate>procedure.Generate Test Case</evaluate>
                <printxml>section.Materials</printxml>
                <remove>section.Materials</remove>
            </loop>
        </procedure>
    </section>
</section>
```

This sample illustrates the use of <include> statements to include the macros 140 prototypes 144, the materials 136, and forms 132 into the program. In the above, the evaluation of the <evaluate> "procedure. Generate Test Case" triggers an associated <show> statement. The <show> statements such as:

<show>tab.Addition/Growth</show> direct the program to look through the forms document for a control named:

<tab>Addition/Growth</tab>

When it finds the object, the program will perform an <answer> to the <show> by evaluating the answer event associated with the particular object being shown. Below is an example of the prototyped <answer> that is associated with the <show> for a tab:

```
<answer>
    <traverse classlist="control" taglist="tab,frame">tab.parent
        <or>
            <eq string="TRUE" attrname="required">tab.parent</eq>
            <notis attrname="coverage">tab.parent</notis>
            <ge attrname="coverage">tab.parent
                <number>
                    <randomnumber minvalue="1" maxvalue="100"/>
                </number>
            </ge>
        </or>
        <show>traverse.current</show>
    </traverse>
</ue_answer>
```

In this example the prototyped <answer> for a tab is to traverse its children controls and perform a <show> on each of them. In turn each of the children controls will execute their prototyped <answer> as described in the XML Prototypes section for each control. For the example of the IMS Additions configurator, the control program would execute the <procedure> Generate Test Case, which would show the IMS Additions forms, traverse all the control objects and "answer" the forms.

The <printxml> statement evaluates the materials documents included in the "Materials" section of the control program using the answers to the controls in the forms documents and prints the materials to an output file. Output files include the simulator materials report, a simulated errors report, test scripts, and dump files for debugging purposes. After the output files are printed by the configurator simulator, the program will clear the "Materials" section using the <remove> statement, which prepares the section for the next loop, or test case. <Printxml> prints to a specified file data in a section, e.g., taglist material characteristic of the material section prints out all materials characteristics.

The process for developing the forms, materials, macros, prototypes, and wrapper and control programs can be much simplified compared to conventional testing techniques. First, the configurator system engineer writes the functional specifications for the application in English and hands them off to the developer and tester. Next, the tester then takes the functional specifications and translates them into a markup language to produce a simulated version of the configurator software application, typically as a series of XML documents to be used by the configurator simulator. Finally, the developer will take the functional specifications and design the actual software application itself.

Referring now to FIG. 3, the operation of the configurator simulator 100 will be discussed with reference to the above XML code. In step 300, the configurator simulator 100 retrieves and loads the appropriate files from the database 120. In step 304, the program executes its <procedure> called "main". Within this procedure, the program enters into a loop. The loop allows for multiple test cases to be executed and is continued until all test cases have been executed. Within the loop, the program in step 304 copies the materials 136 and forms 132 documents into an empty section called "materials". When the simulator is used for volume test case generation, each case requires a clean copy of the materials and forms documents. The "materials" section is used to temporarily store this fresh copy, or boilerplate. In step 308, the program then executes the procedures within the top level "<procedure>Main" that walk the program through the creation of a test case. The output includes, for each test case, an initialization script 17, a wrapper script 150, and, for each listed product, test scripts 152.

Overall program flow control in the configurator simulator 100 is managed by the control program 148 but, after performing setup and housekeeping functions, the control program 148 in step 308 hands responsibility for dialog control to an automation, or robotic, module. This robot is implemented with the <show> statement and <answer> procedure. The <show> statement simulates the invocation of a <tab>, or the "setting of focus" to a control. It accomplishes this by invoking (causing the evaluation of) the <answer> procedure in the <tab> or control. In typical usage, a tab's <answer> procedure is expected to <show> the controls in that page, or to <show> subordinate tabs. The <answer> procedure in a control would typically <set> the values of that control, possibly firing the <event> of that control.

The example below illustrates the behavior of <show> and <answer> initiated from the control program with this <show> statement:

<show>tab.Additions/Growth</show>

The process is as follows:

The <answer> procedure in <tab>Additions/Growth catches the <show> from the control program. It executes <show>tab.Additions/Growth_1, the direct child of the Additions/Growth tab.

The <answer> procedure in tab.Additions/Growth_1 catches the <show> from its parent tab Additions/Growth. It executes <show>menu.Addition/Growth Type, the direct child of the Additions/Growth_1 tab.

The <answer> procedure in <menu>Addition/Growth Type catches the <show> from its parent tab Additions/Growth_1. It traverses its item children and randomly picks one of them.

Built-in <menu> functionality sets the item's value="TRUE". The value of the menu is set to the name of the item randomly chosen.

```
<tab winname="Addition / Growth">Addition / Growth
    <tab winname="Addition/Growth_1">Addition/Growth_1
        <menu value="From [11-50] To 51+">Addition/Growth Type
            <item winname="ListBox">From [1-10] To [11-50]</item>
            <item winname="ListBox">From [1-10] To 51+</item>
            <item winname="ListBox" value="TRUE">From [11-50] To 51+</item>
        </menu>
    </tab>
</tab>
```

Based on the inputs robotically generated by the robotic module of the configurator simulator, the control program 148 of the simulator in step 312 can then, determine which materials are valid and produce the associated output reports and scripts. Using the <printxml> statement the simulator will traverse all materials documents and evaluate each material. If a material is conditioned into existence (if its children's conditional statements are true), then the material and value are printed to the simulator materials report 124. If the conditions for a material are not met, then the material does not exist and will not appear on the material report. Below is an example of the simulator robotically traversing the materials for the IMS Additions configurator and evaluating the materials to see if they exist:

```
<section>IMS Additions Materials
    <material value="1" SMC="178870"> ADV CNVG MNG UPG 11-50 SYS
        <eq string="From [1-10] To [11-50]" value="FALSE">menu.Addition/Growth
Type</eq>
    </material>
    <material value="1" SMC="178871"> ADV CNVG MNG UPG 50+ SYS
        <or value="TRUE">
            <eq string="From [1-10] To 51+" value="FALSE">menu.Addition/Growth
Type</eq>
            <eq string="From [11-50] To 51+" value="TRUE">menu.Addition/Growth
Type</eq>
        </or>
    </material>
</section>
```

In this example the simulator had randomly chosen "From [11-50] To 51+" from the forms document. Therefore, material 178871 exists because its conditional children defined its existence based on the selection of "From [11-50] To 51+" from the menu "Addition/ Growth Type".

The simulator materials report 124 reflects all materials that exist and is created to look exactly like the configurator material report 160:

Request Material Report
New System
Country: THAILAND
System Name: IMS Additions

| Offer Code | Qty | UOM | Dlv# | COS | Description |
|---|---|---|---|---|---|
| | | | [IMS Additions] | | |
| HLO code | 1.000 | | 1 | AM | High Level Offer Code |
| PROJSYS code | 1.000 | | 900 | AM | Project System Offer Code |
| 178871 | 1.000 | EA | 2 | AM | ADV CNVG MNG UPG 50+ SYS |

The remaining simulator output documents include the dump files, the error messages in the simulator error reports 128, and the test scripts 152 used to execute the test case against the actual GUI engine for the configurator. Below is an example of the scripts that are robotically generated using the prototypes for each object.

```
# Addition/Growth tab
obj_get_info ("Addition/Growth", "enabled", x);
if (x == 1)
obj_mouse_click ("Addition / Growth", 11, 11, LEFT);
wait(1);
# Addition/Growth_1 tab
obj_get_info ("Addition/Growth_1", "enabled", x);
if (x == 1)
obj_mouse_click ("Addition/Growth_1", 11, 11, LEFT);
wait(1);
list_select_item ("ListBox", "From [11-50] To 51+");
set_window ("GES Configurator - New", 10);
toolbar_button_press ("ToolbarWindow32_2", "Configure");
```

In the script above, the process flow is to select the tab named "Addition/Growth", followed by selecting the tab named "Addition/Growth_1" followed by selecting the item "From [11-50] To 51+" of the drop down menu.

Referring again to FIG. 3, after the simulator materials report file (and in some cases the simulator error report file) is printed (or saved to another location) in step 312, and the files are deleted from their initial stored locations in step 316. The program then loops back to step 304 to create additional test cases and their associated output.

Once the simulator has generated a series of test cases and created its associated outputs and scripts, the tester can execute the test scripts against the configurator 112 and generate actual application reports 156 and 160. The actual configurator outputs typically include the configurator materials report 160, a configurator error report 156, and a saved version of the test case.

Within the test harness tool 104 program the tester will open the wrapper test script, which will launch the GUI engine 108 and call the first test case script. The scripts will drive the application to select the inputs generated by the simulator 100. The wrapper test script will configure the test case, capture and save the reports, and kick off the next test case script.

Figure 4:
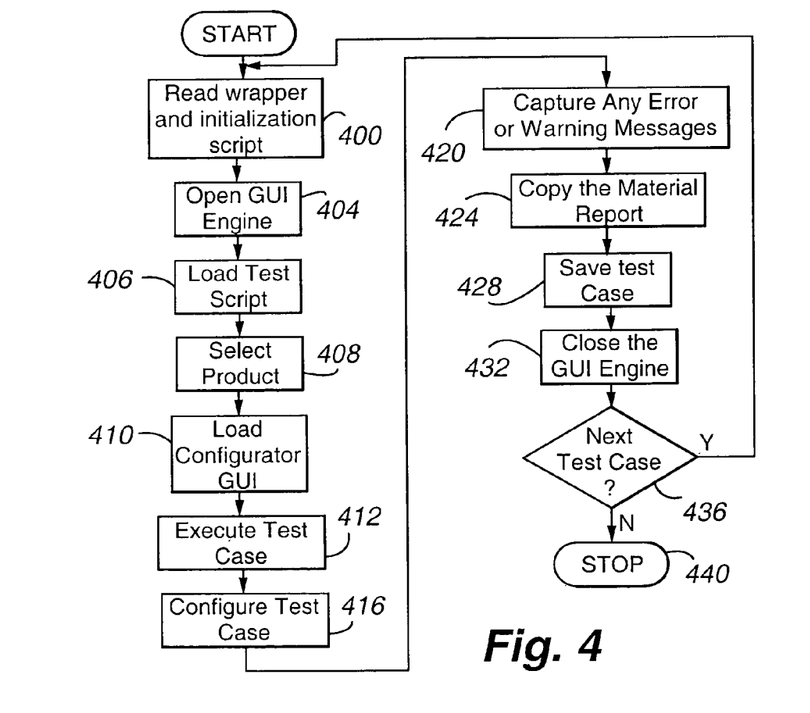
FIG. 4 is a flow chart depicting operation of the test harness tool of FIG. 1.

This process is depicted in FIG. 4. Referring to FIG. 4, in response to the tester opening the main first test script the harness tool 104 in step 400 reads the first wrapper script (which lists the products to be tested) from the first test case; in step 404 the wrapper script 150 causes the GUI engine 108 corresponding to the first test script to be opened; in step 406, the tool 104 loads the initialization script (which lists all test scripts for each product listed); in step 408, the tool selects a first product set forth in a first test script; in step 410, the selection of the first product causes the correct configurator GWI to be opened; in step 412 the tool executes the first test script against the configurator 112 which requires providing the configurator 112 with responses to the GUIs generated by the GUI engine 108 (such as replicating human keystrokes, mouse icon clicks, and the like) thereby driving the configurator 112 to produce the configurator's standard output reports; in step 416 the tool configures the test case associated with the first product and as set forth in the first test script; in step 420 captures the error or warning messages output by the configurator 112 in the configurator error report 156 corresponding to the first test case; in step 424 copies the configurator material report 160 output by the configurator 112; in step 428 saves the test case and the associated configurator output; and in step 432 closes the configurator GUI. In decision diamond 436, the tool 104 determines whether or not there is a next test case. If so, the tool 104 returns to step 400. If not, the tool 104 terminates operation in step 440.

Figure 5:
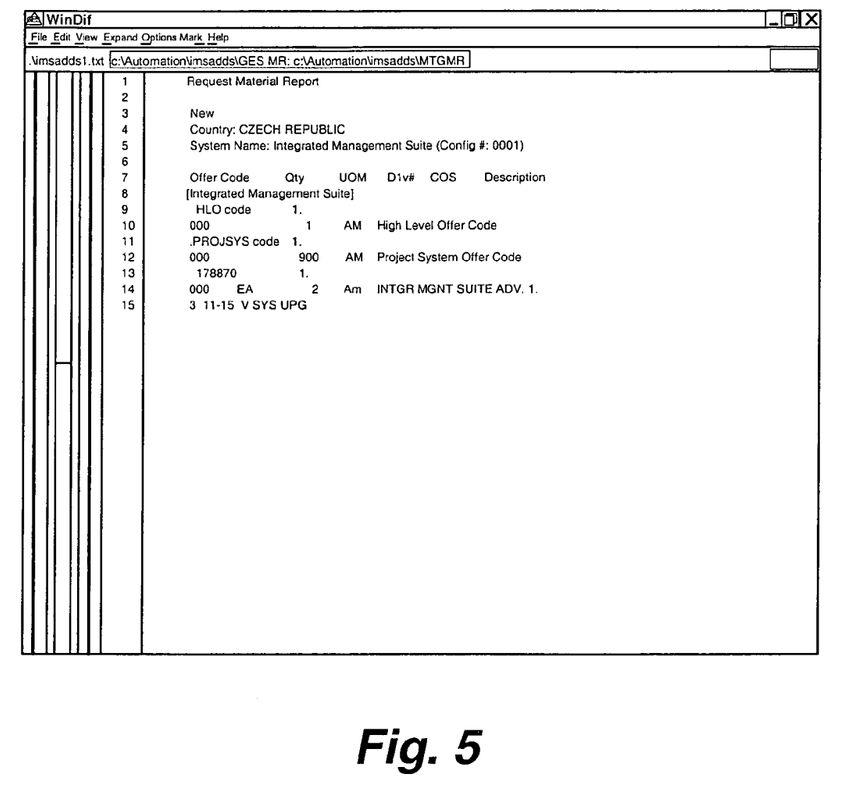
FIG. 5 depicts a GUI display of a difference report generated in the architecture of FIG. 1.

The simulated reports and actual application reports are then compared by the difference engine 116 to find differences between the two sets of reports. In other words, once all of the test scripts have been executed, the tester will have a series of reports for each test case to compare, namely, for each test case, the simulator material report 124 against the configurator material report 160 and the simulator error report 128 against the configurator error report 156. FIG. 5 is a snapshot of a difference report 164 output by the difference engine 116. If there is a difference between a simulator report 124 and 128 and the corresponding configurator report 160 and 156, respectively, this difference will be indicated in Yellow or Red. If the reports are identical to each other, then the screen will identify this and the screen will be white as shown in FIG. 5.

Network-Based Configurator

In another embodiment of the present invention, a network-based configurator is provided based on markup language. The machine code used to run the configurator is written in a markup language along with the input into and the output from the configurator. Generally, the markup language for the configurator code and input and output data objects is the same markup language with XML being preferred. In one configuration, the configurator uses the forms 132, materials 136, macros 140, and prototypes 144 documents and operates using a control program written in markup language.

Figure 6:
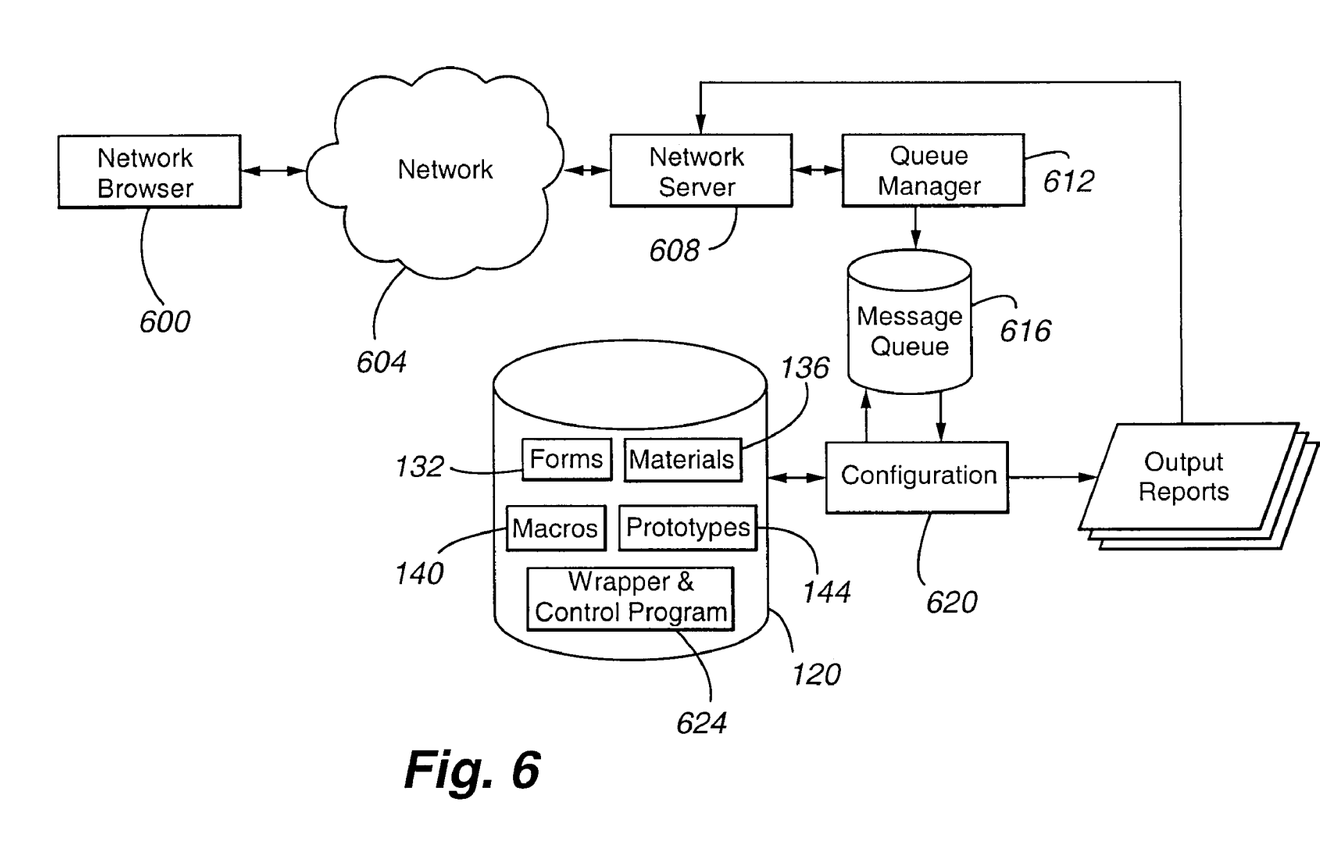
FIG. 6 is a block diagram depicting an architecture according to a second embodiment of the present invention.

An architecture based on this embodiment is depicted in FIG. 6. The architecture comprises a network browser 600 or other graphical rendering engine, a data network 604, a network server 608, a queue manager 612, a message queue 616, a configurator 620, and a database 120 comprising one or more forms 132, materials 136, macros 140, prototypes 144, and a control program 624.

The network browser 600 sends requests from a user to the network server 608, receives responses from the network server 608, and causes display of the responses to the user. The network server 600 likewise receives requests from the network browser 600, provides the requests to the queue manager 612, and receives and sends responses from the queue manager 612 to the network browser 600. The network browser and server 600 and 608 can be any suitable device, such as conventional Web browsers and servers. For example when Web-based, the browser may be implemented based on Microsoft Internet Explorer or Netscape and the server based on UNIX.

The queue manager 616 can be any suitable computational component for controlling the message queue 616. In a preferred configuration, the queue manager is configured as a persistent message manager.

The configurator 620 can be any suitable configurator, with an XML-based configurator being preferred.

Finally, the network 604 can be any packet-switched, distributed processing network, such as the Internet. In a preferred configuration, the network 604 is configured according to the TCP/IP suite of protocols.

In one configuration, messages from the network server 608 provide a display to the user (of the network server) in the form of a drag-and-drop interface. This would require minor extensions to XML to add iconic graphics and an application, such as Visio™ to manage the graphics. As will be appreciated, XML already supports either a bottom-up or top-down system definition.

In one configuration, at least some of the machine code used to control operation of the queue manager and configurator are written in a common markup language, such as XML. The messages exchanged between the components are also in the common markup language.

The operation of the architecture will now be described with reference to FIGS. 7, 8, and 9.

Figure 7:
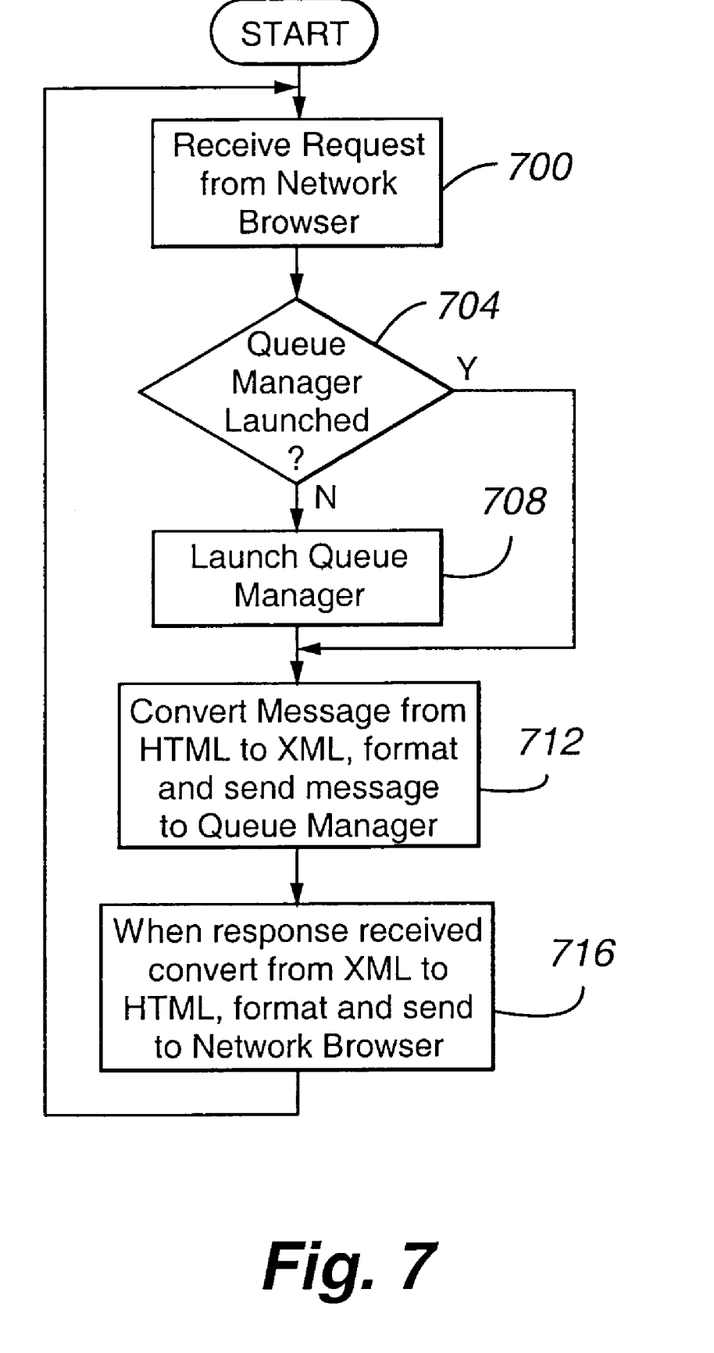
FIG. 7 is a flow chart depicting the operation of the network server of FIG. 6.

Referring to FIG. 7, the user via the network browser 600 sends a request for a configurator output to the network server 608, and in step 700 the request is received by the network server 608. In decision diamond 704, the network server 608 determines whether or not a queue manager 612 the transaction has been launched. If not, the network server 608 in step 708 issues command line instructions in the markup language to create a message queue for the transaction and launch the configurator 620. If not or as part of launching the queue manager 616, the web server, in step 712, converts the request message payload from HTML to XML, formats, and sends the message payload to the queue manager 616. The payload may be provided as part of the command line instructions or as a subsequently sent message.

Figure 8:
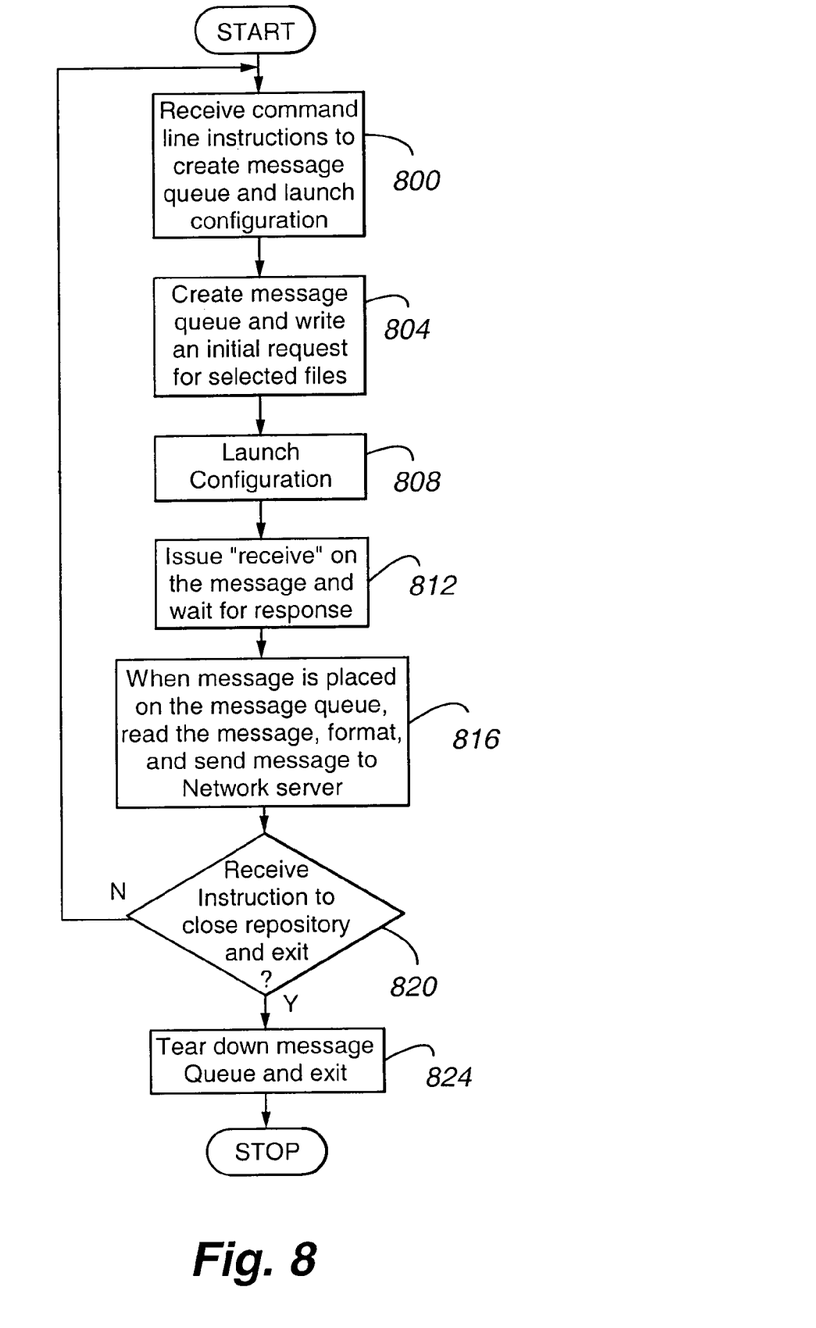
FIG. 8 is a flow chart depicting the operation of the queue manager of FIG. 6.

Referring now to FIG. 8, the queue manager 612 in step 800 receives the command line instructions and in step 804 creates the message queue 616 for the transaction and writes to the message queue 616 an initial request in the markup language for selected output files of the configurator 620. In step 808, the queue manager, using a markup language "<send>" command then sends a message to the configurator 620 to process the request. Finally, in step 812 the queue manager 612 issues a markup language "<receive>" command on the message queue and waits for a response. Examples of XML statements that may be used in these steps, including the "<send>" and "<receive>" statements, are:

```
<prototype class="statement">listen
    <attributes>
        <tag type="identifier"/>
        <port type="string"/>
    </attributes>
</prototype>
<prototype class="statement">accept
    <attributes>
        <tag type="identifier"/>
    </attributes>
</prototype>
<prototype class="statement">receivexml
    <attributes>
        <tag type="identifier"/>
        <reference type="identifier"/>
        <path type="string"/>
    </attributes>
<prototype>
</prototype class="statement">send
    <attributes>
        <tag type="identifier"/>
        <value type="string"/>
    </attributes>
</prototype>
<prototype class="statement">sendfile
    <attributes>
        <tag type="identifier"/>
        <path type="string"/>
    </attributes>
</prototype>
prototype class="statement">sendxml
    <attributes>
        <... same attributes as printxml .../>
    </attributes>
</prototype>
<prototype class="statement">release
    <attributes>
        <tag type="identifier"/>
    </attributes>
</prototype>
```

These statements implement Transfer Control Protocol or TCP communications.

The <listen> statement creates a socket for incoming connections, binds to the socket, then marks the socket so it will listen for incoming connections.

The <accept> statement waits on the socket for a client to connect.

The <receivexml> statement receives an XML structure into its reference. The incoming XML string is expected to terminate with a single null (binary zero) character. The statement uses a temporary file to hold the data incoming from the network. This file has a name like socketrecvnnn.xml, where the nnn is the product identifier or PID of the server (MTG) process, and the file is removed (unlinked) after the receipt of data is complete. If the <path> attribute is specified, it overrides this temporary file name. In this case, or if an error event is triggered by the <receivexml> statement, the file is not removed after data receipt.

The <send> statement sends a message, contained in its <value> attribute, to a connected client. The message is terminated with a single null (binary zero) character.

The <sendfile> statement sends the contents of a file, terminated with a single null (binary zero) character, to a connected client.

The <sendxml> statement acts like a <printxml> statement; it prints a referenced XML structure, and sends it, terminated with a single null (binary zero) character, to a connected client. The statement uses a temporary file to hold the printed XML structure. This file has a name like socketsendnnn.xml, where the nnn is the PID of the server (MTG) process, and the file is removed (unlinked) after the data is sent. If the <path> attribute is specified, it overrides this temporary file name. In this case, or if an error event is triggered by the <sendxml> statement, the file is not removed after the data is sent.

The <release> statement closes the client socket.

The following code fragment implements a simple TCP server, which simply listens on a port, accepts incoming XML structure(s), evaluates then removes the incoming XML structure(s), sends an "OK" message to the client, then releases the client.

```
<section>Main
   <procedure>Main
      <data>
         <section>Receive</section>
      <data>
      <listen port="50000"/>
      <loop>
         <accept/>
         <receivexml path="receiveresults">section.Receive</receivexml>
         <evaluate>section.Receive.child</evaluate>
         remove>section.Receive.child</remove>
         <send value="OK"/>
         <release/>
      </loop>
   </procedure>
</section>
```

To terminate this loop and shut down the server, the client should send the following XML structure(s).

<procedure>
<send value="OK"/>
<release/>
<set attribute="break" value="TRUE">loop.parent</set>
</procedure>

Figure 9:
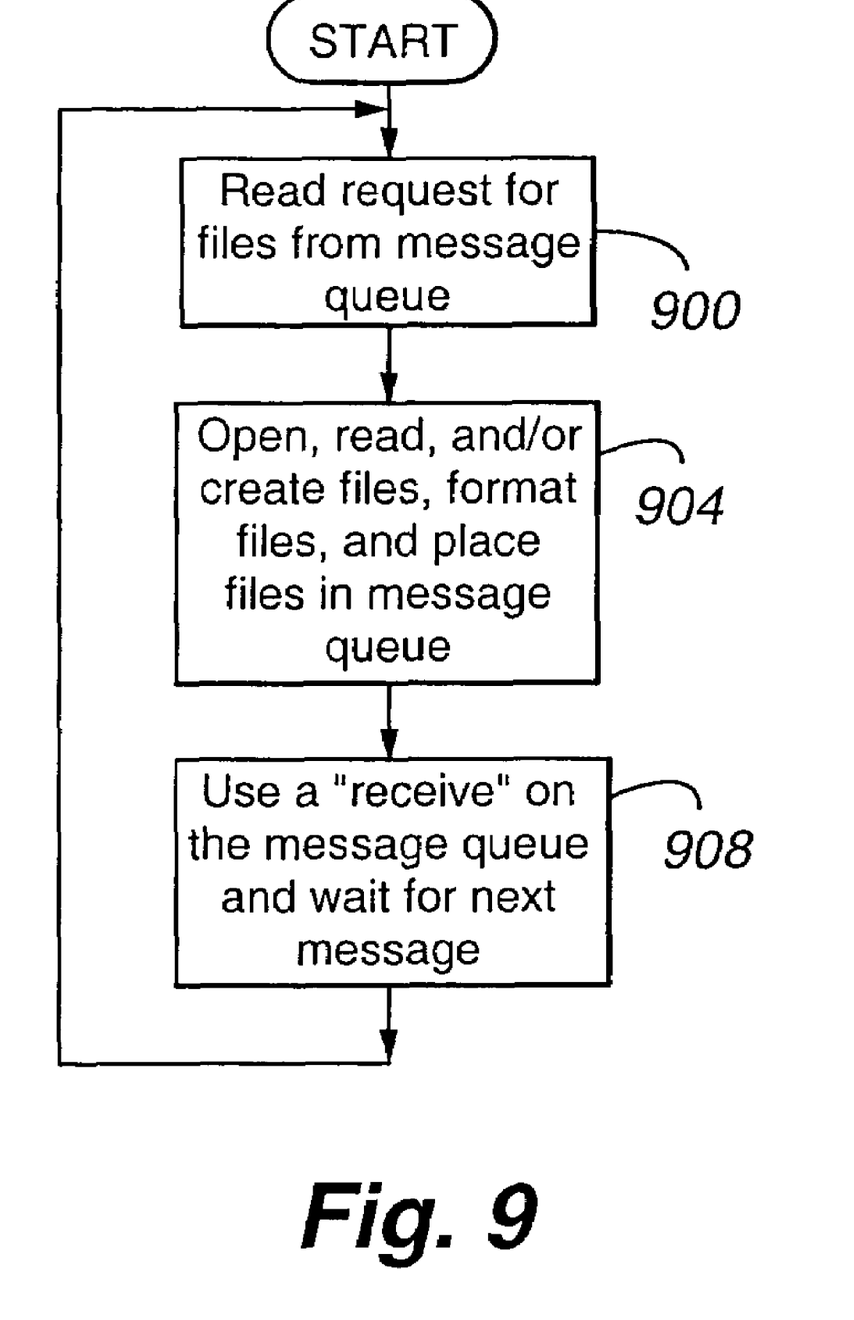
FIG. 9 is a flow chart depicting the operation of the configurator of FIG. 6.

Referring now to FIG. 9, the processing of the request by the configurator 620 will now be described. In step 900, the configurator 620 reads the request for the output files in the message queue 616. In step 904, the configurator 620 opens, reads, and/or creates the requested output files. The process to create the requested output files can be the same method discussed above to create configurator simulator materials and/or error reports. The configurator 620 then formats the files and places the output files (which are in the markup language) in the message queue 616. The configurator 620 in step 908 then issues a "<receive>" command on the message queue 616 and waits for the next message in the transaction.

Referring now to step 816 of FIG. 8, the queue manager 612, when the message is placed in the message queue 616 by the configurator 620, reads, formats, and sends the message to the network server 608. In decision diamond 820, the queue manager 612 determines whether or not it has received an instruction to close the message queue repository and exit. If not, the queue manager 612 returns to step 800 and awaits the next command line instructions from the network server 608. If so, the queue manager 612 in step 824 tears down the message queue 616 and exits. Before exiting, the connection between the network server 608 and queue manager 612 associated with the transaction is maintained. The queue manager 612 may forward a command to the configurator 620 to terminate processing the transaction.

Referring to step 716 of FIG. 7, the network server 608, when the message response is received from the queue manager 612, converts the message payload from XML to HTML (or java script) and formats and sends the message to the network browser 600.

The network browser 600 receives the message and displays it to the user. The user may select a further option on the display or otherwise request additional information. In that event, a request message is sent to the network server 608 and the above process repeated.

The above architecture is persistent or stateful in that, during the transaction, the configurator 620 and queue manager 612 are processing or awaiting processing of messages relating to the transaction. Stated another way, when not actively processing messages the configurator 620 and queue manager 612 are "sleeping."

A number of variations and modifications of the invention can be used. It would be possible to provide for some features of the invention without providing others.

For example in one alternative embodiment, the configurator 620 of FIG. 6 is replaced by a simulation engine, such as the configurator simulator 100. The simulator models a selected function or set of selected functions performed by another computational component. In the case of a simulation engine, the database 120 can include a set of models and associated information.

In another alternative embodiment, the present invention can be used as a simulator for computational components other than a configurator, such as a simulator for any Windows or web-based application, as a mass data generator for load, volume and stress testing of very large databases, as a web application for back-end and forms driver, to name but a few.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A software-controlled computational component for processing input data, comprising:
   (a) a configurator;
   (b) an input to the configurator for input data and an output from the configurator for output data, wherein each of program script setting forth rules for processing the input data to generate the output data, the input data, and the output data are expressed in a markup language and wherein the input data comprises a plurality of forms, materials, macros, and prototypes;
   (c) a queue manager operable to create a message queue for a transaction associated with a selected request and write the selected request to a message queue; and
   (d) a network server operable to receive requests from a network browser and forward the requests to the queue manager;
   wherein the configurator reads the selected request from the message queue, processes the selected request to provide respective output data, and provides the respective output data to the message queue, wherein the queue manager provides the respective output data to the network server, and wherein the network server provides the respective output data to the network browser.

2. The software-controlled computational component of claim 1, further comprising:
   (e) a configurator simulator, wherein output data from the configurator simulator comprises a test script and a simulated materials report.

3. The software-controlled computational component of claim 2, further comprising:
   (f) a test harness tool operable to execute the test script and provide simulated input to the configurator, the configurator producing, as the output data, a configurator materials report; and
   (g) a difference engine operable to compare the simulated materials report against the configurator materials report to identify differences therebetween.

4. The software-controlled computational component of claim 2, wherein the control program script comprises a plurality of tags and the plurality of tags belong to at least one of the following classes: function, control, object, procedure, condition, method, statement, and attribute.

5. The software-controlled computational component of claim 1, wherein the machine code for the queue manager is written in a markup language.

6. The software-controlled computational component of claim 5, wherein the network server is operable to convert the output data from the configurator from a first markup language to a second different markup language.

7. The software-controlled computational component of claim 6, wherein the first markup language is Extensible Markup Language and the second markup language is Hypertext Markup Language.

8. A computer readable medium comprising processor executable machine code that, when executed, performs the steps of claim 1.

9. A software-controlled method for processing input data, comprising:
   (a) providing input data;
   (b) executing a control program which sets forth rules for processing the input data to generate output data, wherein each of the control program script, the input data, and the output data are expressed in a markup language, wherein, in the executing step, the control program is operable to simulate the operation of a configurator, and wherein the output data comprises a test script and a simulated materials report;
   (c) executing the test script to produce a simulated configurator input;
   (d) providing the simulated configurator input to the configurator to produce a configurator materials report; and
   (e) comparing the simulated materials report against the configurator materials report to identify differences therebetween.

10. The method of claim 9, wherein the input data comprises a plurality of forms, materials, macros, and prototypes.

11. The method of claim 9, wherein the control program script comprises a plurality of tags and the plurality of tags belong to at least one of the following classes: function, control, object, procedure, condition, method, statement, and attribute.

12. The method of claim 9, wherein the input data is associated with a sales order and wherein the executing step comprises:
   (B1) based on the input data, retrieving at least one of forms, materials, macros, and prototypes; and
   (B2) determining from the input data and the at least one of forms, materials, macros, and prototypes a list of components associated with the order.

13. The method of claim 12, further comprising:
   (f) receiving the input data in a request from a network browser;
   (g) converting the input data from a second markup language to a first different markup language;
   (h) writing the request comprising the converted input data to a message queue, wherein the executing step is in response to the writing step (h);
   (i) writing a response to the message queue, the response being associated with the output data;
   (j) converting the output data from the first markup language to the second markup language; and
   (k) forwarding the converted output data to the network browser.

14. The method of claim 13, wherein the first markup language is Extensible Markup Language and the second markup language is Hypertext Markup Language.

15. A computer readable medium comprising processor executable machine code operable to perform the steps of claim 9.

16. The method of claim 9, wherein the input data comprises a requirement specification written in the markup language.

17. A software-controlled computational component for processing input data, comprising:
   (a) a control program for controlling the operation of a first computational component;
   (b) an input for input data and an output for output data, wherein the control program comprises rules for processing the input data to generate the output data, wherein each of the control program script, the input data, and the output data are expressed in a markup language, wherein the first computational component is operable to simulate a second computational component, wherein the second computational component is a configurator, and wherein the output data comprises a test script and a simulated materials report;
   (c) a test harness tool operable to execute the test script and provide simulated input to the configurator to produce a configurator materials report; and
   (d) a difference engine operable to compare the simulated materials report against the configurator materials report to identify differences therebetween.

18. The software-controlled computational component of claim 17, further comprising:
   (e) a network server operable to receive requests from a network browser and forward the request to a queue manager; and
   (f) the queue manager operable to create a message queue for the transaction associated with the request and write the request to the message queue.

19. The method of claim 17, further comprising a configurator simulator outputting a test script and a simulated materials report.

20. The method of claim 19, further comprising:
   executing, by a test harness tool, the test script to produce a simulated configurator input;
   providing the simulated configurator input to the configurator to produce a configurator materials report; and
   comparing the simulated materials report against the configurator materials report to identify differences therebetween.

21. A software-controlled method for processing input data, comprising:
   (a) receiving the input data in a request from a network browser, wherein the input data is associated with a sales order;
   (b) converting the input data from a second markup language to a first different markup language;
   (c) writing the request comprising the converted input data to a message queue;
   (d) in response to step (c), executing a control program defining a configurator, the control program setting forth rules for processing the input data to generate output data, wherein each of the control program script, the input data, and the output data are expressed in a markup language and wherein the executing step comprises the sub-steps:
      (D1) based on the input data, retrieving at least one of forms, materials, macros, and prototypes; and
      (D2) determining from the input data and the at least one of forms, materials, macros, and prototypes a list of components associated with the order;
   (e) writing a response to the message queue, the response being associated with the output data;
   (f) converting the output data from the first markup language to the second markup language; and
   (g) forwarding the converted output data to the network browser.

22. A software-controlled computational component for processing input data, comprising:
   (a) a configurator program for defining a configurator;
   (b) an input to the configurator for input data and an output from the configurator for output data, wherein each of the configurator program script, the input data, and the output data are expressed in a markup language;
   (c) a network server operable to receive requests from a network browser and forward the requests to a queue manager; and
   (d) the queue manager operable to create a message queue for a transaction associated with a selected request and write the selected request to the message queue, wherein the machine code for the queue manager is written in a markup language.

23. The software-controlled computational component of claim 22, wherein the network server is operable to convert output from the configurator from a first markup language to a second different markup language.

24. The software-controlled computational component of claim 23, wherein the configurator program script comprises a plurality of tags and the plurality of tags belong to at least one of the following classes: function, control, object, procedure, condition, method, statement, and attribute.

25. The software-controlled computational component of claim 22, wherein the input data comprises a plurality of forms, materials, macros, and prototypes, wherein the configurator reads the selected request from the message queue, processes the selected request to provide respective output data, and provides the respective output data to the message queue, wherein the queue manager provides the respective output data to the network server, and wherein the network server provides the respective output data to the network browser.

26. The software-controlled computational component of claim 22, wherein the first markup language is Extensible Markup Language and the second markup language is Hypertext Markup Language.

* * * * *